(12) United States Patent
Yao et al.

(10) Patent No.: US 9,447,761 B2
(45) Date of Patent: Sep. 20, 2016

(54) DUAL-CHANNEL PIEZOELECTRIC INJECTOR

(71) Applicant: Tianjin University, Tianjin (CN)

(72) Inventors: Mingfa Yao, Tianjin (CN); Yongzhi Li, Tianjin (CN); Zunqing Zheng, Tianjin (CN); Laihui Tong, Tianjin (CN); Xiangyu Zhang, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 14/235,081

(22) PCT Filed: Sep. 17, 2013

(86) PCT No.: PCT/CN2013/083664
§ 371 (c)(1),
(2) Date: Jan. 27, 2014

(87) PCT Pub. No.: WO2014/139274
PCT Pub. Date: Sep. 18, 2014

(65) Prior Publication Data
US 2015/0377197 A1    Dec. 31, 2015

(30) Foreign Application Priority Data

Mar. 14, 2013 (CN) .......................... 2013 1 0081487

(51) Int. Cl.
*F02M 43/04*    (2006.01)
*F02M 51/06*    (2006.01)
(Continued)

(52) U.S. Cl.
CPC ...... *F02M 51/0603* (2013.01); *F02D 19/0694* (2013.01); *F02M 43/04* (2013.01);
(Continued)

(58) Field of Classification Search
CPC ............. F02M 43/04; F02M 51/0603; F02M 51/0607; F02M 61/10; F02M 63/02; F02M 63/0225
See application file for complete search history.

(56) References Cited

U.S. PATENT DOCUMENTS 4,022,165 A * 5/1977 Eckert .................. F02M 45/086
123/300
4,185,779 A * 1/1980 Watson ................ F02M 59/105
123/472

(Continued)

FOREIGN PATENT DOCUMENTS

CN    1589369 A    3/2005
CN    1766304 A    5/2006
(Continued)

*Primary Examiner* — Ryan Reis
(74) *Attorney, Agent, or Firm* — George G. Wang; Bei & Ocean

(57) ABSTRACT

The invention discloses a dual-channel piezoelectric injector, including a dual-channel injector body, its bottom in turn is connected with an upper intermediate, a lower intermediate and a dual-channel needle valve body. At the top of the dual-channel injector body there are two tubing interfaces, and each tubing interface has a tubing fuel duct. There are two laminated piezoelectric actuators and two spray fuel ducts connected to two tubing fuel ducts respectively inside the dual-channel injector body. The upper intermediate and lower intermediate connected with each other to form the middle connection body. From top to bottom of the middle connection body, there is an external control fuel duct, an external spray fuel duct, an internal control fuel duct and internal fuel spray duct. Inside the double-channel needle valve body, there is the sleeve structure of the needle valve hole, at the bottom of double-channel needle valve body there is an internal fuel spray nozzle connecting the internal casing hole which is outside the body, and an external fuel spray nozzle connecting to the external casing hole which is outside the body. Through the two laminated type piezoelectric actuators, control is realized for the pressure difference between the fuel pressure of the fuel control cavity and the fuel pressure of the inner pressure chamber or outer pressure chamber. So it is also realized to control the open or close state of the internal or external needle valve, in turn to control the injection action of the internal fuel spray nozzle or external fuel spray nozzle. The present invention has a simple structure and a low manufacturing cost.

6 Claims, 9 Drawing Sheets

(51) Int. Cl.
*F02M 45/08* (2006.01)
*F02D 19/06* (2006.01)
*F02M 21/02* (2006.01)

(52) U.S. Cl.
CPC ....... *F02M 45/086* (2013.01); *F02M 21/0248* (2013.01); *F02M 2200/46* (2013.01); *F02M 2200/703* (2013.01); *Y02T 10/36* (2013.01)

(56) References Cited

U.S. PATENT DOCUMENTS

| | | | |
|---|---|---|---|
| 5,775,301 A | 7/1998 | Ganser | |
| 5,842,647 A | 12/1998 | Yoshizu et al. | |
| 6,367,453 B1 | 4/2002 | Igashira et al. | |
| 6,422,199 B1 * | 7/2002 | Buckley | F02M 45/086 123/299 |
| 2003/0213858 A1 | 11/2003 | Albrodt et al. | |
| 2007/0246561 A1 * | 10/2007 | Gibson | F02M 45/086 239/5 |
| 2011/0108631 A1 * | 5/2011 | Mumford | F02M 21/0263 239/5 |
| 2013/0247875 A1 * | 9/2013 | Jay | F02M 43/04 123/447 |

FOREIGN PATENT DOCUMENTS

| | | |
|---|---|---|
| CN | 2779090 Y | 5/2006 |
| CN | 102900578 A | 1/2013 |
| CN | 103133205 A | 6/2013 |
| EP | 1607619 A2 | 12/2005 |
| GB | 2290834 A | 1/1996 |
| JP | 3744335 B2 | 4/2002 |
| WO | WO2012078133 A | 6/2012 |

* cited by examiner

FIG.4
FIG.5
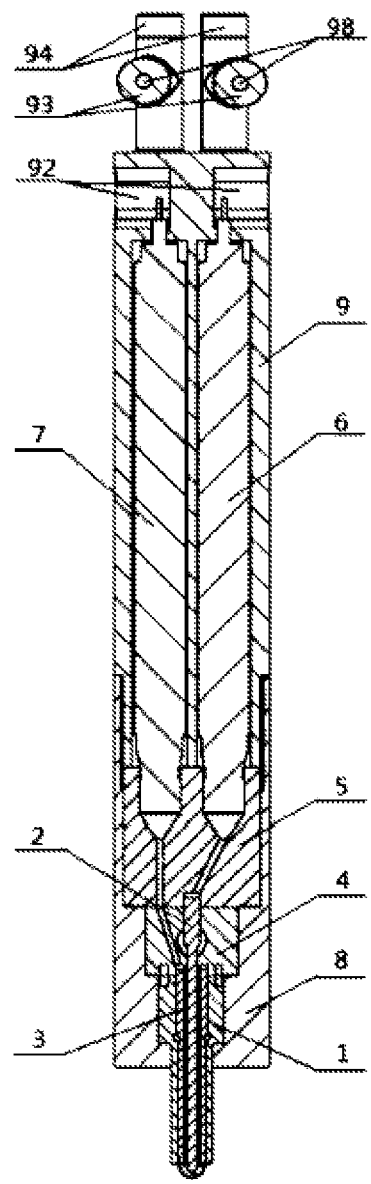
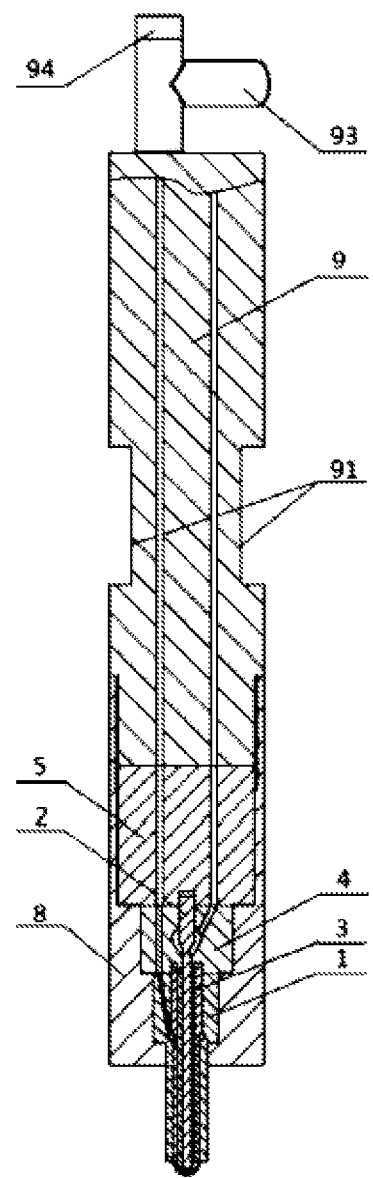

DUAL-CHANNEL PIEZOELECTRIC INJECTOR

CROSS-REFERENCE TO RELATED APPLICATIONS

This application claims priority from CN Application No. CN 201310081487.6, filed Mar. 14, 2013 and PCT Application No. PCT/CN2013/083664, filed Sep. 17, 2013, the contents of which are incorporated herein in the entirety by reference.

FIELD OF THE INVENTION

The invention is related to a dual-channel piezoelectric injector for the high pressure common rail electronically controlled fuel injection system in the dual-fuel engine or the high pressure common rail electronically controlled fuel injection system in the dual-rail engine, and especially for the dual fuel engine or dual common rail engine.

BACKGROUND OF THE INVENTION

With the energy depletion and environmental pollution worsening gradually, various new-type combustion technologies emerge, and the dual-fuel combustion technology appears. With the development of electronic technology and the improvement of internal combustion engine design, the diesel technology, gasoline technology and dual-fuel engine technologies such as gasoline/natural gas dual-fuel engine, natural gas /diesel dual-fuel engine, gasoline/diesel dual-fuel engine, biodiesel/diesel dual-fuel engine have been developed rapidly.

Since the cylinder combustion status of the internal combustion engine affects the overall performance of the engine directly, organizing injection reasonably and further controlling cylinder combustion are the most direct and effective way to improve the engine performance. Currently, the fuel injection system applied to the dual-fuel engine is mostly the dual-injector system, that is, two injectors are mounted in three different ways to realize different methods of injection: The first way is that a fuel injector is installed on the intake manifold, while another one is installed on the cylinder head to make one fuel injected on the intake manifold and another injected in cylinder. The second way is that two injectors are all installed on the intake manifold, to make both fuel injected on the intake manifold. The third way is that two injectors are all installed on the cylinder head, to make both fuel injected in cylinder.

The first two of the three injection ways can be achieved by modifying the existing single fuel injector engine, but they impose a specific restriction on the physical characteristics of the fuel, that is, the fuel injected external cylinder has a high volatility.

The third way has broad development prospects as there is no restriction on the physical properties of the fuel. But it complicates the structure of the cylinder head, making difficult to modify the existing single injector engine and also increasing the manufacturing cost.

At present, there are some dual-channel injectors in the market, but they are very complex and the installation of them needs to change the cylinder head.

SUMMARY OF THE INVENTION

The purpose of the invention is to overcome prior art technical problems and shortcomings, and provide a dual-channel piezoelectric injector applied to a dual-fuel engine or a dual-rail engine.

In order to solve the above technical problems, the dual-channel piezoelectric injector is designed as follows:

Including a dual-channel injector body, its characteristics are at the bottom of the injector body successively connected with an upper intermediate, a lower intermediate and a double-channel needle valve body; At the top of the dual-channel injector body above has two tubing interfaces, and each tubing interface has a tubing fuel duct. There are two laminated piezoelectric actuators and two spray fuel ducts connecting two tubing fuel ducts respectively in the dual-channel injector body.

The upper intermediate and the lower intermediate are connected to form a middle connection body. From top to bottom of the middle connection body, there are an external control fuel duct, an external spray fuel duct, an internal control fuel duct and an internal fuel spray duct. At the top of the external control fuel duct, there is an external working stroke amplifier which is in the form of a taper cavity. At the bottom of the external control fuel duct, there is an external control fuel cavity, the shape of which is an annular groove. At the top of the internal control fuel duct, there is an internal working stroke amplifier which is in the form of a taper cavity. Within the internal control fuel duct there is equipped with an internal control fuel cavity, and at the bottom of the internal control fuel duct there is an inner pressure chamber. Within the external control fuel duct there is equipped with an external control fuel cavity, and at the bottom of the external control fuel duct there is an outer pressure chamber.

In the double-channel needle valve body, there is a needle valve hole of a sleeve structure, and at the bottom of the double-channel needle valve body there are an internal fuel spray nozzle and an external fuel spray nozzle, both connecting to the external and the internal casing hole. In the middle of the external casing hole, there is an outer pressure chamber, and the external spray fuel duct from the middle connection body extends to the external pressure chamber. The top of the external casing hole is in connection with the external control fuel cavity which is of an annular groove shape at the bottom of the middle connection body, which forms the first space to accommodate the external needle valve body, and the first space has an axial size greater than the length of the external needle valve body. The top of the internal casing hole is in connection with the internal control fuel cavity which is of a cylinder shape at the bottom of the middle connection body, which forms the second space to accommodate the internal needle valve body, and the second space has an axial size greater than the length of the internal needle valve body.

The external spray fuel duct and the internal spray fuel duct are connected respectively with two tubing fuel ducts of the dual-channel injector body, so that dual channels are formed from the two tubing fuel ducts to the external and internal casing hole of the double-channel needle valve body.

The bottom of the two laminated type piezoelectric actuators are embedded in the top opening of the external control fuel duct and the internal control fuel duct, respectively, in the middle of the middle connection body. The two laminated type piezoelectric actuators are used to control the fuel pressure within the fuel control cavity so as to form a fuel pressure difference between the fuel control cavity and the pressure chamber (i.e., the inner pressure chamber and the outer pressure chamber, respectively). The fuel pressure difference opens or closes the internal or external needle valve, which in turn controls the injection action of the internal fuel spray nozzle or the external fuel spray nozzle.

Compared with existing technologies, the advantages of the present invention are:

1. This dual-channel piezoelectric injector uses laminated type piezoelectric actuator that drives the injector directly, so that the injector has a quick response and an improved sensitivity. It is better than the electromagnetic valve control injector and the indirect piezoelectric actuator control injector.

2. The dual-channel piezoelectric injector can realize multiple injections of different fuels into a cylinder, and there are no specific requirements for the physical characteristics of the fuel.

3. For the dual-channel piezoelectric injector, the angle of the fuel injection can be changed by having two nozzles inject at the same time through collision and interference of two fuel sprays.

4. Using the dual-channel piezoelectric injector, it can eliminate excrescent mounting hole structure used in direct injecting and reduce the complexity of the cylinder head, thereby reducing the costs of the manufacture and application of the injector.

BRIEF DESCRIPTION OF THE DRAWINGS

FIG. 4 is a left side-sectional view of the injector in FIG. 1;

FIG. 5 is a back composite side-sectional view of the injector in FIG. 1;

Figure 1:
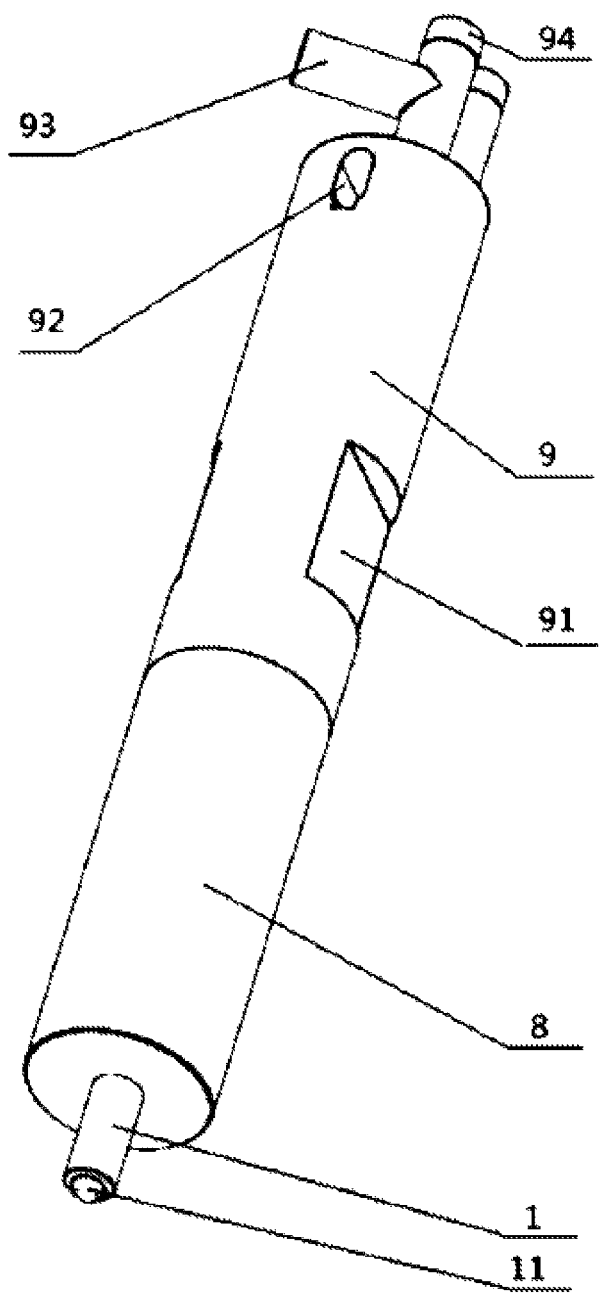
FIG. 1 is a perspective view of a dual-channel piezoelectric injector of the invention.
Figure 2:
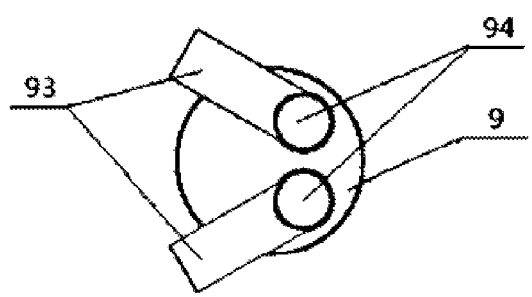
FIG. 2 is a top view of the injector in FIG. 1.
Figure 3:
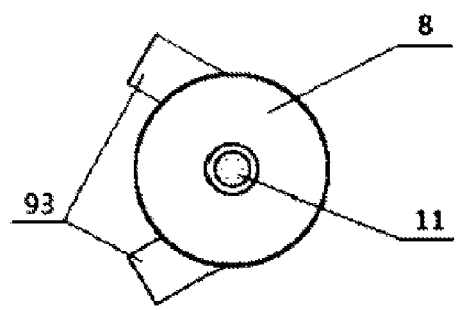
FIG. 3 is a bottom plan view of the injector in FIG. 1.

In the FIG.:
1—the dual-channel needle valve body
2—the internal needle valve body
3—the external needle valve body
4—the lower intermediate
5—the upper intermediate
6, 7—the laminated type piezoelectric actuator
8—the fixing sleeve
9—the dual-channel injector body
11—the internal fuel spray nozzle
12—the external fuel spray nozzle
13—the needle body bulkhead
14, 44, 57—the external spray fuel duct
16—the outer pressure chamber
31—the external needle valve seal cone surface
32—the external needle valve pressure-bearing surface
33—the external needle valve inner cylinder
40, 48—the inner needle valve guide hole
45, 55—the external control fuel duct
46—the external control fuel cavity
47, 54—the internal spray fuel duct
49—the inner pressure chamber
51—the internal working stroke amplifier
53—the external working stroke amplifier
56—the internal control fuel duct
58—the internal control fuel cavity
61—the actuator seal body
62—the actuator pressure-bearing body
63—the terminal
91—the injector fixed slot
92—the terminal slot
93—the fuel tubing interface
94—the fuel tubing seal body
95—the terminal mounting holes
96—the internal fuel cavity
97—the external fuel cavity
98—the tubing fuel duct
99—the body bulkhead

DETAILED DESCRIPTION OF PARTICULAR EMBODIMENTS OF THE INVENTION

The present invention is further described in conjunction with various embodiments of the invention.

As shown in FIG. 1, FIG. 2, FIG. 3, FIG. 4 and FIG. 5, the invention of the dual-channel piezoelectric injector is mainly composed of the dual-channel needle valve body 1, an internal needle valve 2, an external needle valve 3, a lower intermediate 4, an upper intermediate 5, two laminated type piezoelectric actuators 6 and 7, a fixing sleeve 8, and a dual-channel injector body 9.

Figure 18:
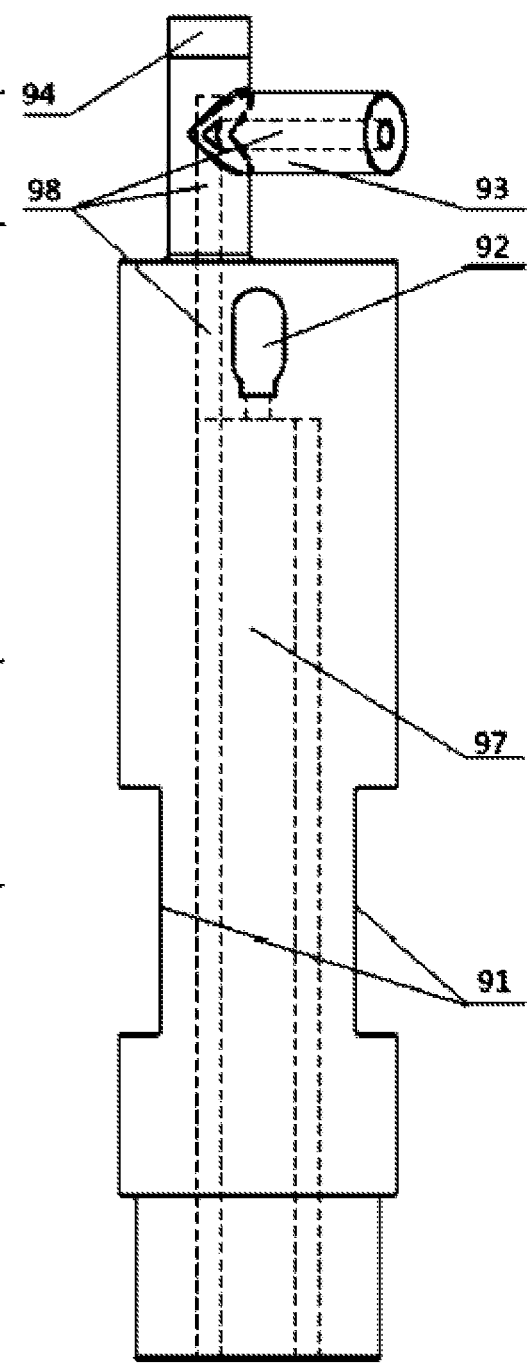
FIG. 18 is a rear view of the dual-channel injector body 9 in FIG. 15.

The bottom of the dual-channel injector body 9 is successively connected to the upper intermediate 5, the lower intermediate 4 and the double-channel needle valve body 1. At the top of the dual-channel injector body 9 there are two tubing interfaces 93, and each tubing interface 93 has a tubing fuel duct 98. There are two laminated piezoelectric actuators and two spray fuel ducts connected with two tubing fuel ducts respectively in the dual-channel injector body 9, as shown in FIG. 5 and FIG. 18.

The characteristic of the dual-channel piezoelectric injector is illustrated in FIG. 4: the positioning and connection of the injector body 9, upper intermediate 5, lower intermediate 4 and double-channel needle valve body 1 are facilitated with a positioning pin and positioning hole structure, using the fixing sleeve 8 and a thread structure to make sure that the injector body 9, upper intermediate 5, lower intermediate 4 and double-channel needle valve body 1 are fixed closely to each other.

As shown in FIG. 4, FIG. 8, FIG. 10, FIG. 11, FIG. 12 and FIG. 13, the upper intermediate 5 and lower intermediate 4 are connected with each other to form the middle connection body. From top to bottom of the middle connection body, there are the external control fuel duct 45 and 55, the external spray fuel duct 44 and 57, the internal control fuel duct 56 and the internal spray fuel duct 47 and 54. At the top of the external control fuel duct 55, there is an external working stroke amplifier 53 in the form of a taper cavity. At the bottom of the external control fuel duct 45, there is an external control fuel cavity 46 in the form of an annular groove. At the top of the internal control fuel duct 56, there is an internal working stroke amplifier 51 in the form of a taper cavity. Within the internal control fuel duct there is equipped with internal control fuel cavity 58, and at the bottom of the internal control fuel duct 56 there is an inner pressure chamber 49. Within the external control fuel duct, it is equipped with external control fuel cavity 44, and at the bottom of the external control fuel duct 44 there is an outer pressure chamber 16.

Figure 6:
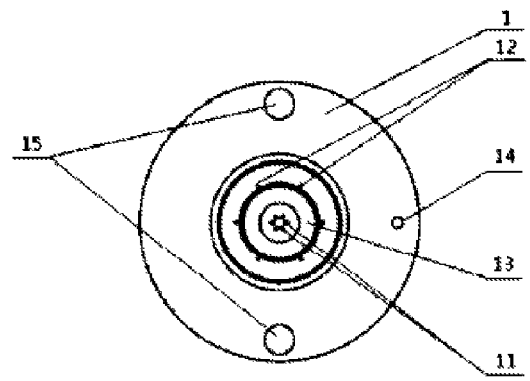
FIG. 6 is a top view of the dual-channel needle valve body 1 in FIG. 4.
Figure 7:
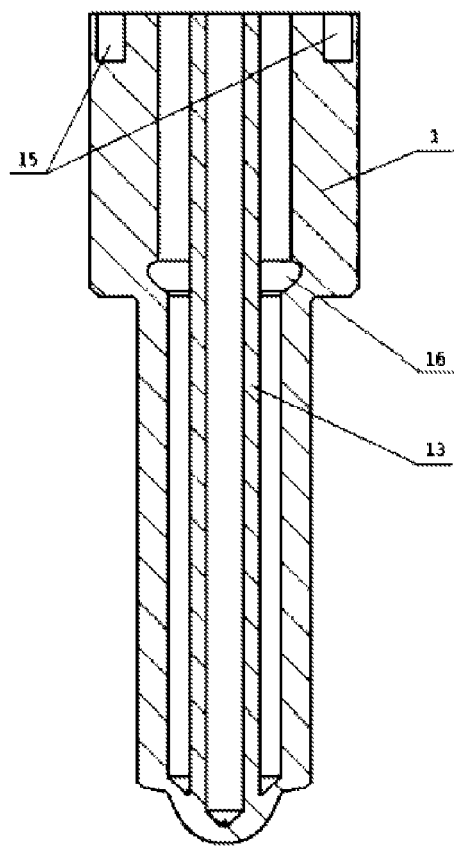
FIG. 7 is a side-sectional view of the dual-channel needle valve body 1 in FIG. 4.
Figure 8:
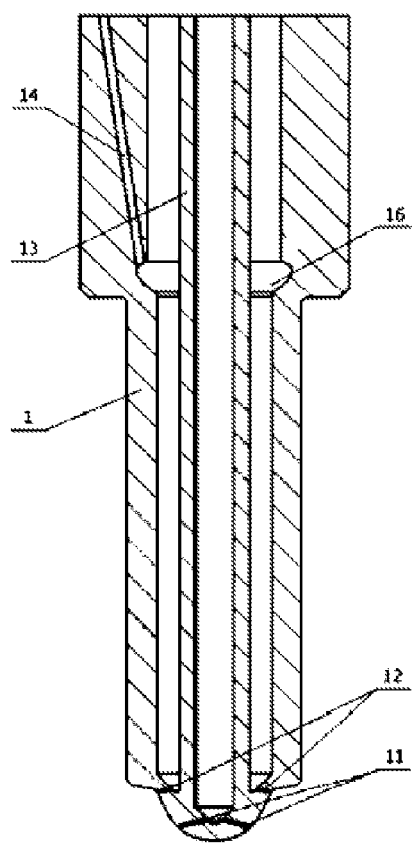
FIG. 8 is a side-sectional view of the dual-channel needle valve body 1 in FIG. 5.
Figure 9:
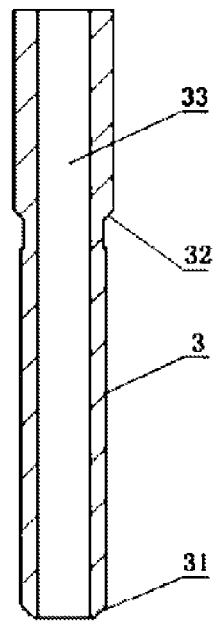
FIG. 9 is a side-sectional view of the external needle valve body 3 in FIG. 4.

As shown in FIG. 6, FIG. 7 and FIG. 8, in the double-channel needle valve body 1, there is the sleeve structure of the needle valve hole. At the bottom of the needle valve hole, there is an internal fuel spray nozzle 11 which is opened to the outside and the internal casing hole, and an external fuel spray nozzle 12 which is opened to the outside and the external casing hole. In the middle of the external casing hole, there's an outer pressure chamber 16, and the external spray fuel duct runs from the middle connection body down to the outer pressure chamber 16. The top of the external casing hole is connected with the external control fuel cavity at the bottom of the middle connection body, forming the first space to accommodate the external needle valve body 3, and the first space has an axial size greater than the length of the external needle valve body 3. The top of the internal casing hole is connected with the internal control fuel cavity at the bottom of the middle connection body forming the second space used to accommodate the internal needle valve body 2, the second space has an axial size greater than the length of the internal needle valve body 2.

As shown in FIG. 5 and FIG. 18, the external spray fuel duct and the internal spray fuel duct are connected respectively with two tubing fuel ducts 98 of the dual-channel injector body 9, thereby forming dual channels from the two tubing fuel ducts to, respectively, the external casing hole and internal casing hole of the double-channel needle valve body 1.

Figure 14:
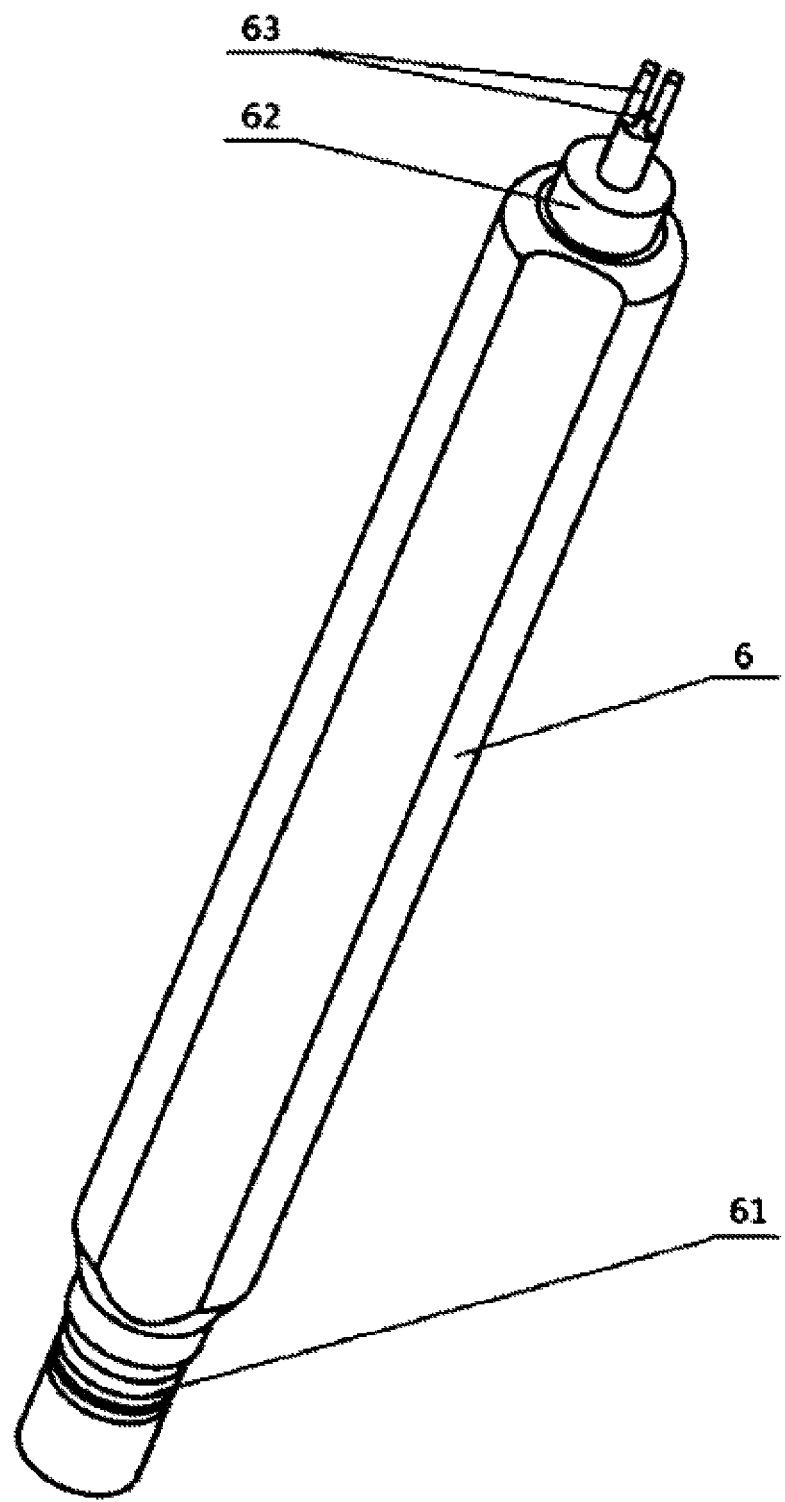
FIG. 14 is a perspective view of the laminated type piezoelectric actuator in FIG. 4.

As shown in FIG. 14, the laminated type piezoelectric actuator 6 or 7 includes actuator seal body 61, actuator pressure-bearing body 62 and terminal 63 connected to the control circuit. The bottoms of the two laminated type piezoelectric actuators 6 and 7 are embedded in the top openings of the external control fuel duct 55 and internal control fuel duct 56, respectively, in the middle of the middle connection body. The two laminated type piezoelectric actuators 6 and 7 controls the pressure difference between the fuel control cavity and the inner pressure chamber 49 and outer pressure chamber 16, respectively. The pressure difference controls the closing or opening of the internal or external needle valve, which in turn controls the injection action of the internal fuel spray nozzle 11 or external fuel spray nozzle 12.

The inner channel fuel path: the internal channel control fuel path includes the actuator seal body 61 located below the internal laminated type piezoelectric actuator 6, the internal working stroke amplifier 51, the internal control fuel duct 56 and the internal control fuel cavity 58. The internal channel spray fuel path includes the internal spray fuel duct 47 and 54, the inner pressure chamber 49, the internal needle valve seal cone surface (similar to the external needle valve seal cone surface 31), the internal needle valve pressure-bearing surface (similar to the external needle valve pressure-bearing surface 32) and the internal fuel spray nozzle 11.

The outer channel fuel path: the external channel control fuel path includes the actuator seal body 61 located below the external laminated type piezoelectric actuator 7, the external working stroke amplifier 53, the external control fuel duct 45 and 55 and the external control fuel cavity 46. The external channel spray fuel path includes the external spray fuel duct 1444 and 57, the outer pressure chamber 16, the external needle valve seal cone surface 31, the external needle valve pressure-bearing surface 32 and the external fuel spray nozzle 12.

Figure 15:
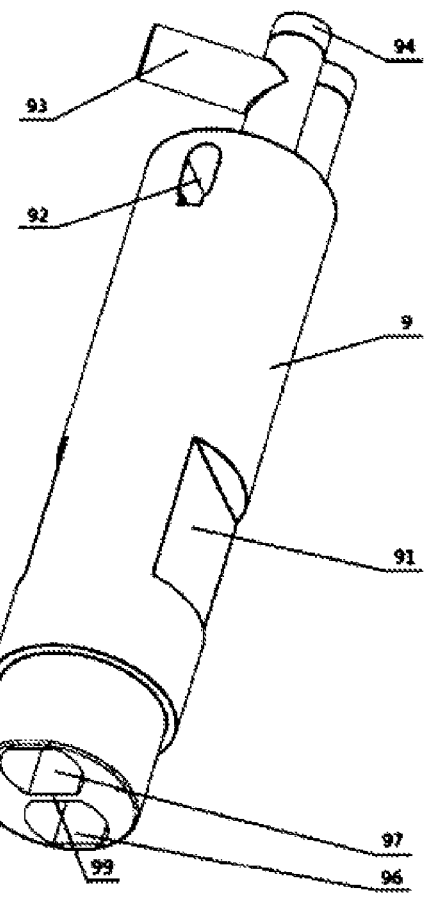
FIG. 15 is a perspective view of the dual-channel injector body 9 in FIG. 1.
Figure 16:
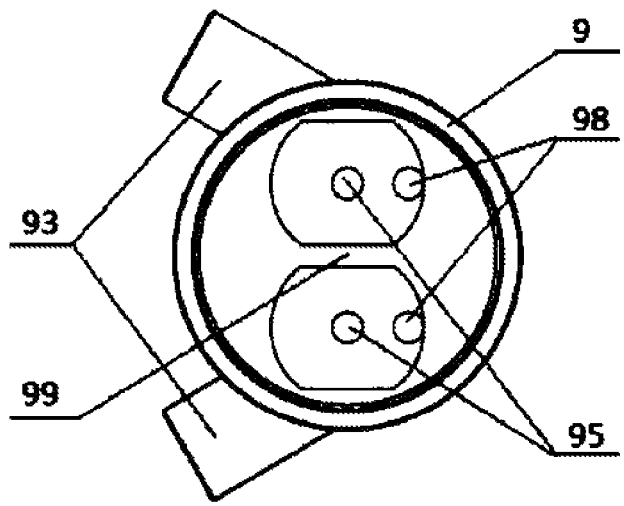
FIG. 16 is a bottom view of the dual-channel injector body 9 in FIG. 15.
Figure 17:
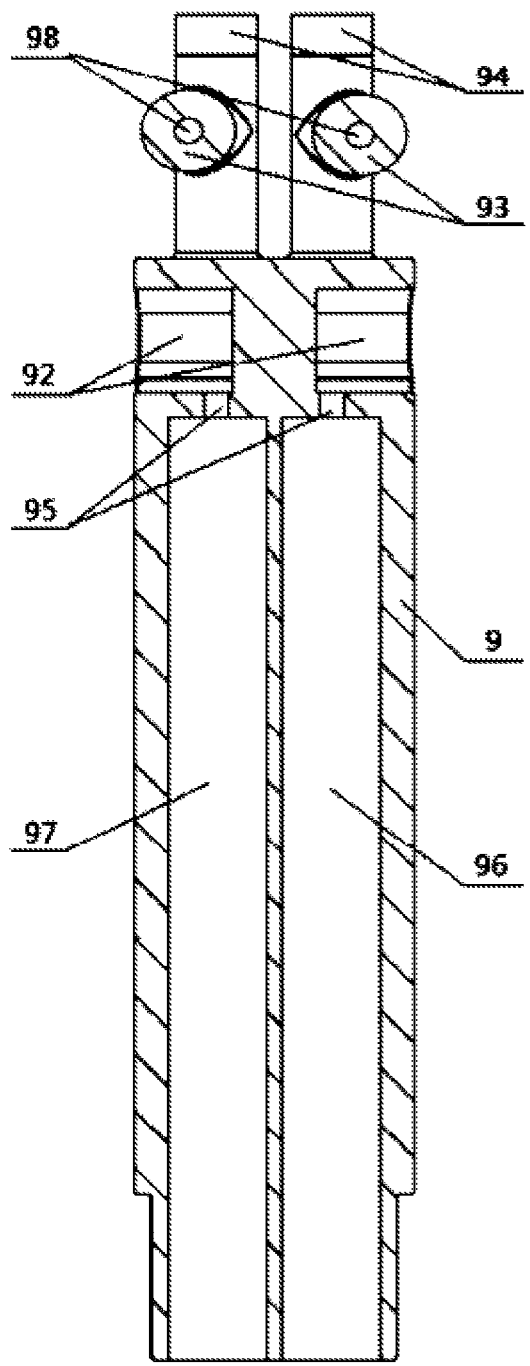
FIG. 17 is a left view and side-sectional view of the dual-channel injector body 9 in FIG. 15.

Isolation between the dual-channel fuel paths: The body bulkhead 99 as shown in FIG. 15 is located at the common central plane of the internal working stroke amplifier 51 and the external working stroke amplifier 53, and bottom surface of the body bulkhead 99 seal contacts with the upper surface of the upper intermediate 5 to realize the isolation between the internal fuel cavity 96 and the external fuel cavity 97. The upper surface of the needle body bulkhead 13 seal contact with the bottom surface of the lower intermediate 4, which ensures perfectly isolating between the inner channel fuel path and the outer channel fuel path. In addition, the inner spaces of the double-channel needle valve body 1, the lower intermediate 4, the upper intermediate 5 are designed in a way to ensure isolation of the channel fuel path, control fuel path and spray fuel path between the external channel and the internal channel.

Figure 10:
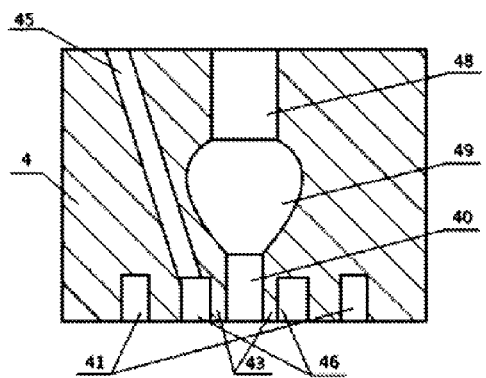
FIG. 10 is a side-sectional view of the lower intermediate 4 in FIG. 4.
Figure 11:
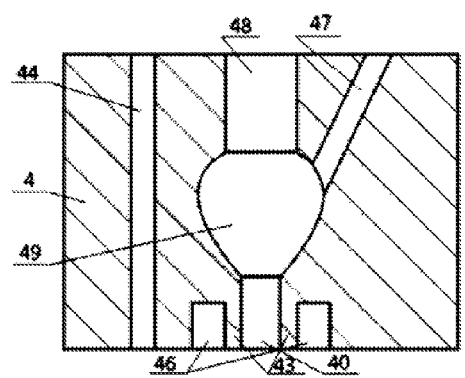
FIG. 11 is a side-sectional view of the lower intermediate 4 in FIG. 4.
Figure 12:
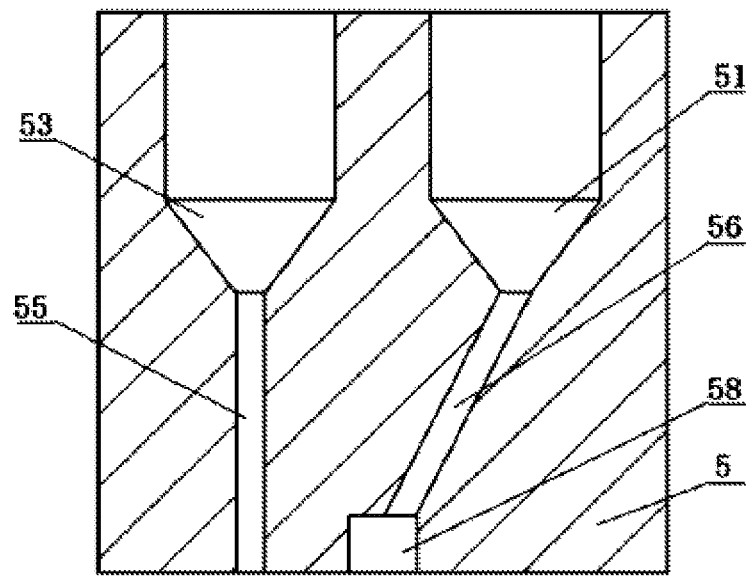
FIG. 12 is a side-sectional view of the upper intermediate 4 in FIG. 5.
Figure 13:
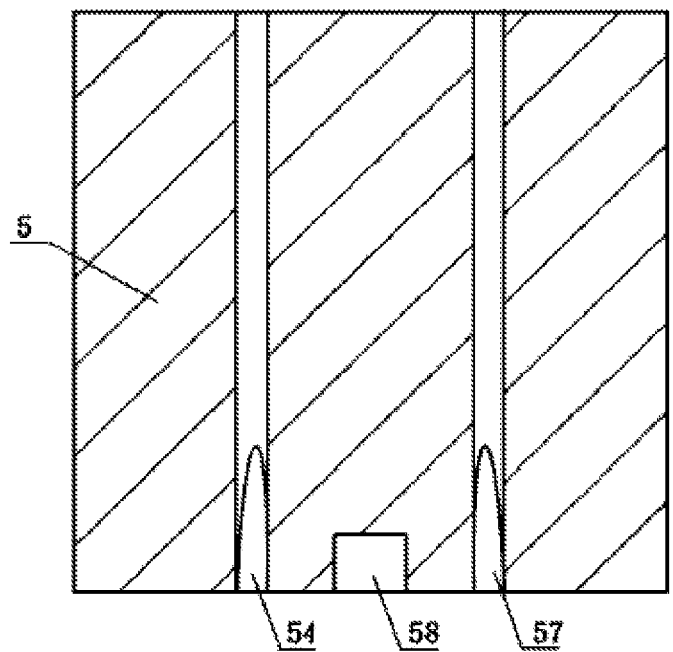
FIG. 13 is a side-sectional view of the upper intermediate 4 in FIG. 5.

The fixed and connection form of each connection part in the present invention are shown in FIG. 6, FIG. 10 and FIG. 11: the surface contact between dual-channel needle valve body 1 and the lower intermediates 4 respectively is designed so that a dowel pin is placed in each positioning hole 15, 41 to achieve precise positioning between the double-channel needle valve 1 and the lower intermediate 4; a similar mechanism is used to achieve precise positioning between the lower intermediate 4 and the upper intermediate 5. The fixing sleeve 8 through the screw thread structure firmly fixes together the double channel needle valve body 1, the lower intermediate 4, the upper intermediate 5 and the dual-channel injector body 9 into a single working unit.

The movement of the needle valve: The clearance fit between the external needle valve 3 and the first space internal surface, i.e. the external needle valve inner cylinder 33 and the needle body bulkhead 13, forms a mobile vice. The clearance fit between the internal needle valve 2 and the second space internal surface, i.e. the inner surface of the inner needle valve guide hole 40, 48 and the outer surface of the internal needle valve 2, forms a mobile vice.

The Working Principle of the Dual-Channel Piezoelectric Injector of the Present Invention:

As shown in FIG. 4, FIG. 5, FIG. 7, FIG. 8 and FIG. 17, there are two fuel tubing interfaces 93, a number of fuel tubing ducts 98, a body bulkhead 99, an upper intermediate 5, a lower intermediates 4 and a needle body bulkhead 13. Through the design of the seal, positioning and drilling, two independent and non-interference fuel paths are formed, each including a control fuel path and an injection fuel path.

As shown in FIG. 4 and FIG. 14, the actuator seal bodies 61 of the laminated type piezoelectric actuator 6 and 7 seal fit with the external working stroke amplifier and the internal working stroke amplifier, respectively. The high-pressure fuel exits of the two working stroke amplifiers are connected to the top surfaces of the internal and external of the needle valve, respectively, to form two control fuel paths.

As shown in FIG. 5 and FIG. 18, with dowel positioning, the double-channel needle valve body 1, the lower intermediate 4 and the upper intermediate 5 form, by design of sealing, positioning and drilling, two spray fuel paths.

By changing the voltage value of the terminal 63 of the laminated type piezoelectric actuator (6 or 7), the laminated type piezoelectric actuator 6 or 7 can be shortened or elongated. The actuator pressure-bearing body 62 is fastened to the dual-channel injector body 9, when the laminated type piezoelectric actuator 6 or 7 shortens, the actuator seal body 61 will move up and reduce the pressure of the control fuel cavity (46 or 58). This increases the pressure of the chamber (16 or 49) so that the needle valve body (2 or 3) moves up and the fuel injects. When the laminated type piezoelectric actuator (6 or 7) expands, the actuator seal body 61 will move downward. This increases the pressure of the control fuel cavity (46 or 58) and reduces the pressure of the chamber (16 or 49), so that the needle valve body (2 or 3) moves down and fuel injection stops.

Through the working stroke amplifier (51 or 53), a small length variation of the laminated type piezoelectric actuator (6 or 7) is translated into a large displacement of the needle valve body (2 or 3), to effectively control the opening and closing of the needle valve.

The Fuel Injection Control Process of the Dual-channel Piezoelectric Injector:

The injection control of the internal channel fuel duct: When the laminated type piezoelectric actuator 6 contracts, the pressure of the internal control fuel duct 56 will be less than the pressure of the internal spray fuel duct (47,54), and then the internal needle valve sealing cone surface will lift the double-channel needle valve body 1, the first high pressure fuel will arrive at the internal fuel spray nozzle 11, and start internal channel injection. When the laminated type piezoelectric actuator 6 expands, the pressure of the internal control fuel duct 56 will be greater than the pressure of the internal spray fuel duct (47,54), and then the internal needle sealing cone surface will seal contact with the double-channel needle valve body 1 and stop internal channel injection.

The injection control of the external channel fuel duct: When the laminated type piezoelectric actuator 7 contracts, the pressure of the external control fuel duct (45,55) will be less than the pressure of the external spray fuel duct (14, 44,57), and then the external needle valve sealing cone surface 31 will lift the double-channel needle valve body 1, the second high pressure fuel will arrive at the external fuel spray nozzle 12, and start external channel injection. When the laminated type piezoelectric actuator 7 expands, the pressure of the external control fuel duct (45,55) will be greater than the pressure of the external spray fuel duct (14,44,57), and then the external needle sealing cone surface 31 will seal the double-channel needle valve body 1, and stop internal channel injection.

In this invention, the size of the dual-channel piezoelectric injector is the same as ordinary injector. This invention eliminates the dual-mounting-hole structure usually used in the dual fuel direct injection engine, and simplifies the cylinder cover. The present invention can be used with two fuels or single fuel and can realize the dual fuel injection or multiple injection of a single fuel with different injection pressure in cylinder. At the same time, it can reduce the costs of manufacture and application of the injectors.

For injecting the fuel earlier, the internal fuel spray nozzle 11 can be used to avoid or reduce the wet wall phenomenon. When needing two nozzles to inject at the time, the function of the two fuel beam collision and interference can be used to realize the change of the fuel injection angle, and to further avoid early wet wall phenomenon. The present invention can provide the better injection characteristics and meet the need of a dual fuel engine and a dual track engine.

In combination with drawings, we have described this invention in detail. The present invention however is not limited to the above described embodiment. Rather, the specific embodiment of the above method is just schematic, rather than restrictive. A person of ordinary skill in the art can make various modifications without departing from the principles of this invention, and these modifications shall fall within the scope of the claimed invention.

What is claimed is:

1. A dual-channel piezoelectric fuel injector, comprising two independent fuel channels, each of which comprises a laminated piezoelectric actuator, a control fuel duct, a spray fuel duct and fuel spray nozzle having sequentially an upper section, a pressure chamber, a lower section, and a plurality of orifices at a lower end, wherein said laminated piezoelectric actuator, via a working stroke amplifier (51 or 53), is connected to said control fuel duct which in turn is connected to an upper end of said upper section of said fuel spray nozzle; said spray fuel duct is connected to said pressure chamber of said fuel spray nozzle; and said upper section of said fuel spray nozzle defines a space for accommodating a needle valve (2 or 3) which, in responding to a changing stroke distance of said piezoelectric actuator, controls fuel injection through said orifices at the end of said fuel spray nozzle, and wherein said two fuel channels operate independently from each other for injecting a same type of fuel or two different types of fuel.

2. The injector of claim 1, wherein said two independent channels are integrated in and encompassed by a generally cylindrical-shaped body comprising a plurality of interconnected sections fixed in position by a threaded outer sleeve element (8).

3. The injector of claim 1, wherein said laminated piezoelectric actuator comprises a seal (61), a pressure-bearing body (62) and a terminal (63) connected to a control circuit.

4. The injector of claim 1, wherein said needle valve is clearance seal fit within an internal wall of said upper section of said fuel spray nozzle.

5. The injector of claim 1, wherein said needle valve has a pressure-bearing surface.

6. The injector of claim 1, wherein said two fuel channels are referred to as an internal fuel channel and an external fuel channel, respectively, and the fuel spray nuzzle of said external fuel channel encompasses the fuel spray nuzzle of said internal fuel channel in a concentrically manner.

* * * * *